J. O. WILSON.
TRAILER TRUCK.
APPLICATION FILED MAY 19, 1917.

1,267,487.

Patented May 28, 1918.
2 SHEETS—SHEET 2.

Witness
George C. Schultz

Inventor,
John O. Wilson,
By Rummler & Rummler,
Attys.

UNITED STATES PATENT OFFICE.

JOHN O. WILSON, OF CHICAGO, ILLINOIS.

TRAILER-TRUCK.

1,267,487. Specification of Letters Patent. Patented May 28, 1918.

Application filed May 19, 1917. Serial No. 169,627.

*To all whom it may concern:*

Be it known that I, JOHN O. WILSON, a citizen of the United States of America, and a resident of Chicago, county of Cook, and State of Illinois, have invented certain new and useful Improvements in Trailer-Trucks, of which the following is a specification.

The main objects of this invention are to provide an improved form of truck, particularly adapted for use as a trailer for a motor vehicle; to provide an improved trailer truck in which the rear wheels will track with the front wheels at all times, so that in turning corners the rear wheels of the trailer will swing out around the corner; and to provide an improved guideway construction for rigidly supporting the sliding and pivotal connection of the front and rear reaches of the truck.

An illustrative embodiment of this invention is shown in the accompanying drawings, in which—

Figure 1:
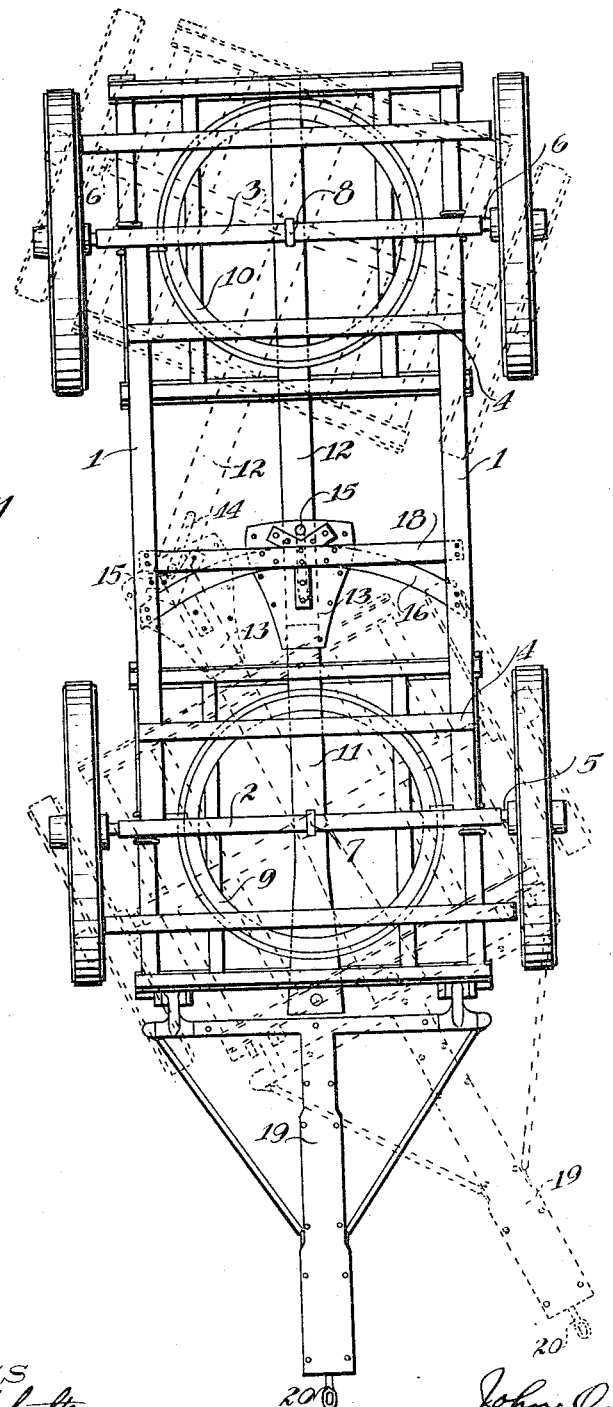
Figure 1 is a top plan view of the improved trailer truck, with its position when turning a corner shown in dotted outline.
Figure 2:
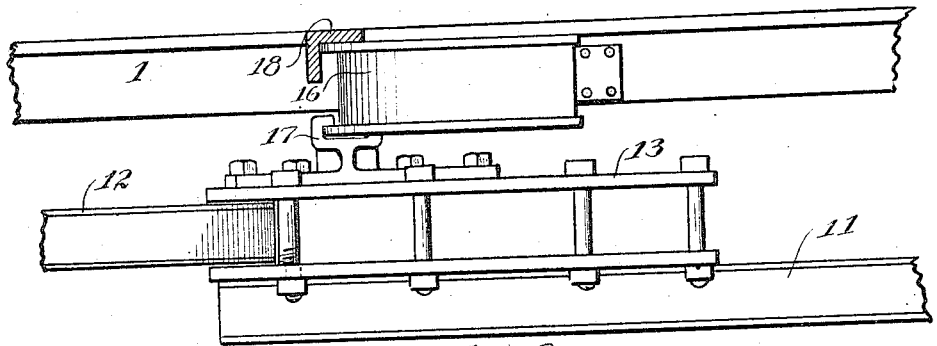
Fig. 2 is an enlarged side elevation of the sliding and pivotal connection between the front and rear reaches and the guideway which rigidly supports the same.
Figure 3:
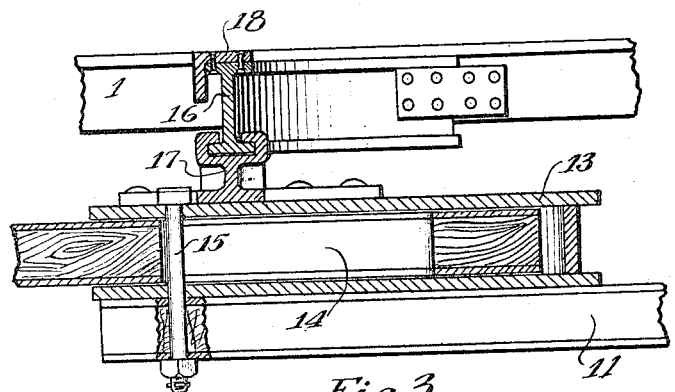
Fig. 3 is a longitudinal sectional elevation of the same.

In the construction shown in the drawings, a chassis frame, comprising side bars 1, front and rear bolsters 2 and 3 respectively, and cross braces 4, has a front axle 5 pivotally mounted at and supporting one end thereof, and a rear axle 6 pivotally mounted at and supporting the other end thereof. The bolsters and axles are pivoted on the front and rear king-bolts 7 and 8 respectively, and front and rear fifth wheels 9 and 10 respectively are provided in the usual manner.

The front axle 5 is provided with a rearwardly extending reach 11 having one end rigidly mounted thereon. A forwardly extending reach 12 is rigidly mounted on the rear axle 6, and its free end extends adjacent to the rearwardly extending free end of the front reach 11, and a sliding and pivotal connection is provided therebetween.

The sliding and pivotal connection between the front and rear reaches comprises a flat, substantially V-shaped hollow guide-box 13, rigidly mounted with its apex extending forwardly, on the upper side of the free end of the front reach 11. The rear end of the guide-box 13 is open, and the forwardly extending free end of the rear reach 12 extends thereinto.

A longitudinally disposed slot 14 is provided in the free end of the reach 12, and a connecting pin or bolt 15 is mounted on the guide-box 13 and is adapted to extend through the slot 14. The connecting pin 15 passes through the upper and lower sides of the guide-box 13 and through the rear end of the reach 11, thereby assisting in holding the guide-box rigidly on said reach.

The pivotal and sliding connection between the front and rear reaches is supported and rigidly held against vertical movement by a guideway in the form of an I-beam 16 mounted at its opposite ends on the side bars 1 of the chassis frame. A member 17 is rigidly mounted on the upper side of the guide-box 13 and is adapted to have sliding connection with the lower flanges of the I-beam guide 16. The guideway 16 is of arcuate form, the center of curvature being coincident with the king-pin 7, which is the pivotal connection between the supporting chassis and the front axle 5. The guideway 16 being of arcuate shape allows for the greatest possible angular movement of the axles relatively of the frame with the movement of the sliding connection confined within the width of the frame. The medial part of the guideway is additionally supported by a cross brace in the form of an angle iron 18 mounted at its opposite ends on the side frames 1 of the chassis and having its medial portion rigidly secured to the medial part of the guideway 16.

A draw-bar or tongue member 19 is attached to the front end of the truck, and the outer end thereof is provided with a spring mounted rod 20 by which the truck may be attached to suitable propelling means.

Figure 4:
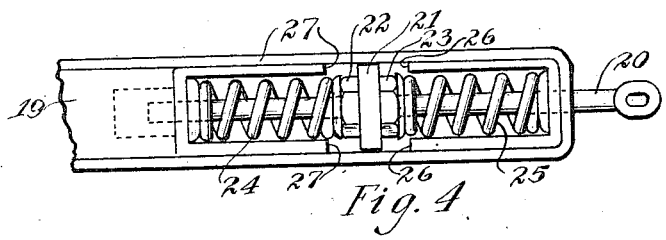
Fig. 4 is an enlarged detail of the draw-bar.

The rod 20 is provided at its medial part with a block 21 rigidly mounted thereon by suitable threaded nuts 22 and 23, and a pair of compression springs 24 and 25 are coiled helically about the rod 20 in position to bear against and hold the block 21 in a substantially center position as shown in Fig. 4. Rigid shoulders 26 and 27 are mounted adjacent the block 21 and spaced away therefrom in position to have said block abut thereagainst when moved against the action of the springs 24 and 25.

In the operation of the device, it is attached to the rear end of a vehicle such as a motor truck, and when the vehicle to which it is attached turns a corner, the front axle of the trailer is turned as shown in dotted outline in Fig. 1. When thus turned, the rear axle is turned a corresponding amount in the opposite direction, said axle being turned through the medium of the sliding and pivotal connection between the adjacent ends of the rigidly mounted reaches 11 and 12. This turning of the rear axle causes the rear end of the truck to swing out around the corner being turned.

The arcuate guideway 16 rigidly and securely supports the connection between the reaches and prevents any vertical movement thereof, at the same time permitting them to be freely moved in a horizontal direction.

When the wheels of the truck drop into a rut or are stubbed against some projection, a considerable strain is thrown upon the sliding and pivotal connection between the front and rear reaches, and it is very important to have a rigid supporting means at this point for strengthening and securely holding the free ends of the reaches.

Although but one specific embodiment of this invention has been herein shown and described, it will be understood that numerous details of the construction shown may be altered or omitted without departing from the spirit of this invention as defined by the following claims.

I claim:

1. In a vehicle, the combination of a supporting frame, a pair of axles pivoted on said frame, a reach rigidly mounted on each of said axles and having the inner ends thereof extending toward and being adjacent each other, means for slidably and pivotally connecting the inner ends of said reaches together, a guideway on said supporting frame, said guideway being of arcuate shape on a center coincident with the pivot of one of said axles, and means on the reach of said one axle for slidably engaging said guideway.

2. In a vehicle, the combination of a supporting frame, a pair of axles pivoted on said frame, a reach rigidly mounted on each of said axles and having the inner ends thereof extending toward and being adjacent each other, means for slidably and pivotally connecting the inner ends of said reaches together, a guideway on said supporting frame, said guideway being of arcuate shape on a center coincident with the pivot of one of said axles, a horizontally disposed ledge formed on said guideway, and opposed shoulders on the end of one of said reaches slidably engaging opposite sides of said ledge.

3. In a vehicle, the combination of a supporting frame, a pair of axles pivoted on said frame, a reach rigidly mounted on each of said axles and having the inner ends thereof extending toward and being adjacent each other, means for slidably and pivotally connecting the inner ends of said reaches together, a guideway on said supporting frame, said guideway being of arcuate shape on a center coincident with the pivot of one of said axles, a horizontally disposed ledge, and a C-shaped member located on the end of one of said reaches adapted to embrace said ledge so as to be slidably supported thereon.

4. In a vehicle, the combination of a supporting frame, a front axle pivotally mounted at one end of said frame, a rear axle pivotally mounted at the other end of said frame, a rearwardly extending reach rigidly mounted on said front axle, a flat V-shaped hollow guide-box rigidly mounted on the free end of said reach with the apex of said V-shaped box extending forwardly, the rear end of said box being open, a forwardly extending reach rigidly mounted on said rear axle, the free end of said rear reach being adapted to extend into the open rear end of said guide-box and being provided with a longitudinally disposed slot therein, a pin mounted on said box and adapted to extend through said slot, said pin and slot connection permitting said reaches to have a slidable and pivotal connection with each other, a guideway on said supporting frame, said guideway being of arcuate shape on a center coincident with the pivot of said front axle, and means on said guide-box for slidably engaging said guideway.

5. In a vehicle, the combination of a supporting frame, a pair of axles pivoted on said frame, a reach rigidly mounted on each of said axles and having the inner ends thereof extending toward and being adjacent each other, means for slidably and pivotally connecting the inner ends of said reaches together, a guideway mounted at its ends on said supporting frame, said guideway being of arcuate shape on a center coincident with the pivot of one of said axles, means on the reach of said one axle for slidably engaging said guideway, and a supporting brace having its ends mounted on said supporting frame and its medial part connected to the medial part of said arcuate guideway for supporting the same.

6. In a vehicle, the combination of a supporting frame, a front axle pivotally mounted at one end of said frame, a rear axle pivotally mounted at the other end of said frame, a rearwardly extending reach rigidly mounted on said front axle, a flat V-shaped hollow guide-box rigidly mounted on the free end of said reach with the apex of said V-shaped box extending forwardly, the rear end of said box being open, a forwardly extending reach rigidly mounted on said rear axle, the free end of said rear reach being adapted to extend into the open rear end of said guide-box and being provided with a longitudinally disposed slot therein, a pin mounted on said box and adapted to extend through said slot, said pin and slot connection permitting said reaches to have a slidable and pivotal connection with each other, a guideway mounted at its ends on said supporting frame, said guideway being of arcuate shape on a center coincident with the pivot of said front axle, means on said guide-box for slidably engaging said guideway, and a supporting brace having its ends mounted on said supporting frame and its medial part connected to the medial part of said arcuate guideway for supporting the same.

Signed at Chicago this 16th day of May, 1917.

JOHN O. WILSON.

Copies of this patent may be obtained for five cents each, by addressing the "Commissioner of Patents, Washington, D. C."